United States Patent
Bathurst et al.

(10) Patent No.: US 10,503,372 B2
(45) Date of Patent: Dec. 10, 2019

(54) NAVIGATION AMONG ITEMS IN A NETWORK PAGE

(71) Applicant: Zappos IP, Inc., Las Vegas, NV (US)

(72) Inventors: Dylan Kent Bathurst, Henderson, NV (US); Ian Christian Myers, Henderson, NV (US)

(73) Assignee: Amazon Technologies, Inc., Seattle, WA (US)

( * ) Notice: Subject to any disclaimer, the term of this patent is extended or adjusted under 35 U.S.C. 154(b) by 555 days.

(21) Appl. No.: 15/200,426

(22) Filed: Jul. 1, 2016

(65) Prior Publication Data
US 2016/0313885 A1   Oct. 27, 2016

Related U.S. Application Data

(62) Division of application No. 12/851,661, filed on Aug. 6, 2010, now Pat. No. 9,384,507.

(51) Int. Cl.
| | |
|---|---|
| G06Q 30/00 | (2012.01) |
| G06F 17/30 | (2006.01) |
| G06F 3/0484 | (2013.01) |
| G06Q 30/06 | (2012.01) |
| G06Q 30/02 | (2012.01) |
| H04L 29/08 | (2006.01) |

(52) U.S. Cl.
CPC ........... *G06F 3/0484* (2013.01); *G06Q 30/02* (2013.01); *G06Q 30/0631* (2013.01); *G06Q 30/0641* (2013.01); *H04L 67/02* (2013.01)

(58) Field of Classification Search
CPC .................. G06Q 30/0641; G06Q 30/0631
See application file for complete search history.

(56) References Cited

U.S. PATENT DOCUMENTS

| | | | | |
|---|---|---|---|---|
| 8,121,902 B1* | 2/2012 | Desjardins | ......... | G06Q 30/0601 705/26.1 |
| 8,560,398 B1* | 10/2013 | Gregov | ................ | G06Q 30/06 705/26.2 |
| 9,064,279 B1* | 6/2015 | Tuan | ................ | G06Q 30/0631 |
| 2004/0098747 A1* | 5/2004 | Kay | ................ | H04N 5/44543 725/95 |
| 2008/0034381 A1* | 2/2008 | Jalon | ................ | G06F 17/30126 719/329 |

(Continued)

OTHER PUBLICATIONS

Demandware delivers SiteGenesis(TM) best practices eCommerce storefront for apparel retailers. (Apr. 6, 2009). Business Wire Retrieved from http://search.proquest.com/docview/444172011?accountid=14753.*

*Primary Examiner* — Kathleen Palavecino
(74) *Attorney, Agent, or Firm* — Thomas | Horstemeyer, LLP (57) ABSTRACT

Disclosed are various embodiments for browsing items in a network page. A plurality of images of a corresponding plurality of items are displayed in a network page rendered on a display device of a client device. A first level of information detail about each of the items is presented in the network page. A window is generated that is anchored to a currently designated one of the images. The window presents a second level of information detail about a respective one of the items depicted in the designated one of the images presented in the window. The currently designated one of the images is specified by navigating from image to image.

19 Claims, 5 Drawing Sheets

(56) References Cited

U.S. PATENT DOCUMENTS

| | | | | |
|---|---|---|---|---|
| 2009/0043674 A1* | 2/2009 | Minsky | ............ | G06Q 30/0603 |
| | | | | 705/26.8 |
| 2009/0299880 A1* | 12/2009 | Stoppelman | ...... | G06F 17/30994 |
| | | | | 705/26.1 |
| 2010/0094729 A1* | 4/2010 | Gray | ............ | G06Q 30/06 |
| | | | | 705/26.1 |
| 2011/0145101 A1* | 6/2011 | Berger | ............ | G06F 17/30867 |
| | | | | 705/27.1 |
| 2011/0306398 A1* | 12/2011 | Boch | ............ | G06F 3/011 |
| | | | | 463/7 |

* cited by examiner

NAVIGATION AMONG ITEMS IN A NETWORK PAGE

CROSS-REFERENCE TO RELATED APPLICATIONS

This application is a divisional of and claims priority to U.S. application Ser. No. 12/851,661 titled "NAVIGATION AMONG ITEMS IN A NETWORK PAGE", filed Aug. 6, 2010, which is incorporated herein by reference in its entirety.

BACKGROUND

Shoppers who purchase products over the Internet may perform searches for items using various search functions provided by online merchants. Often there may be a large number of products responsive to a given search performed by a customer. This can make it difficult to quickly review items to isolate those that a customer may wish to purchase.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

In various embodiment, an approach to navigating from item to item in a search result network page is provided that facilitates a user view of item details in a quick manner without referring to subsequent network pages. In the following discussion, a general description of the system and its components is provided, followed by a discussion of the operation of the same.

Figure 1:
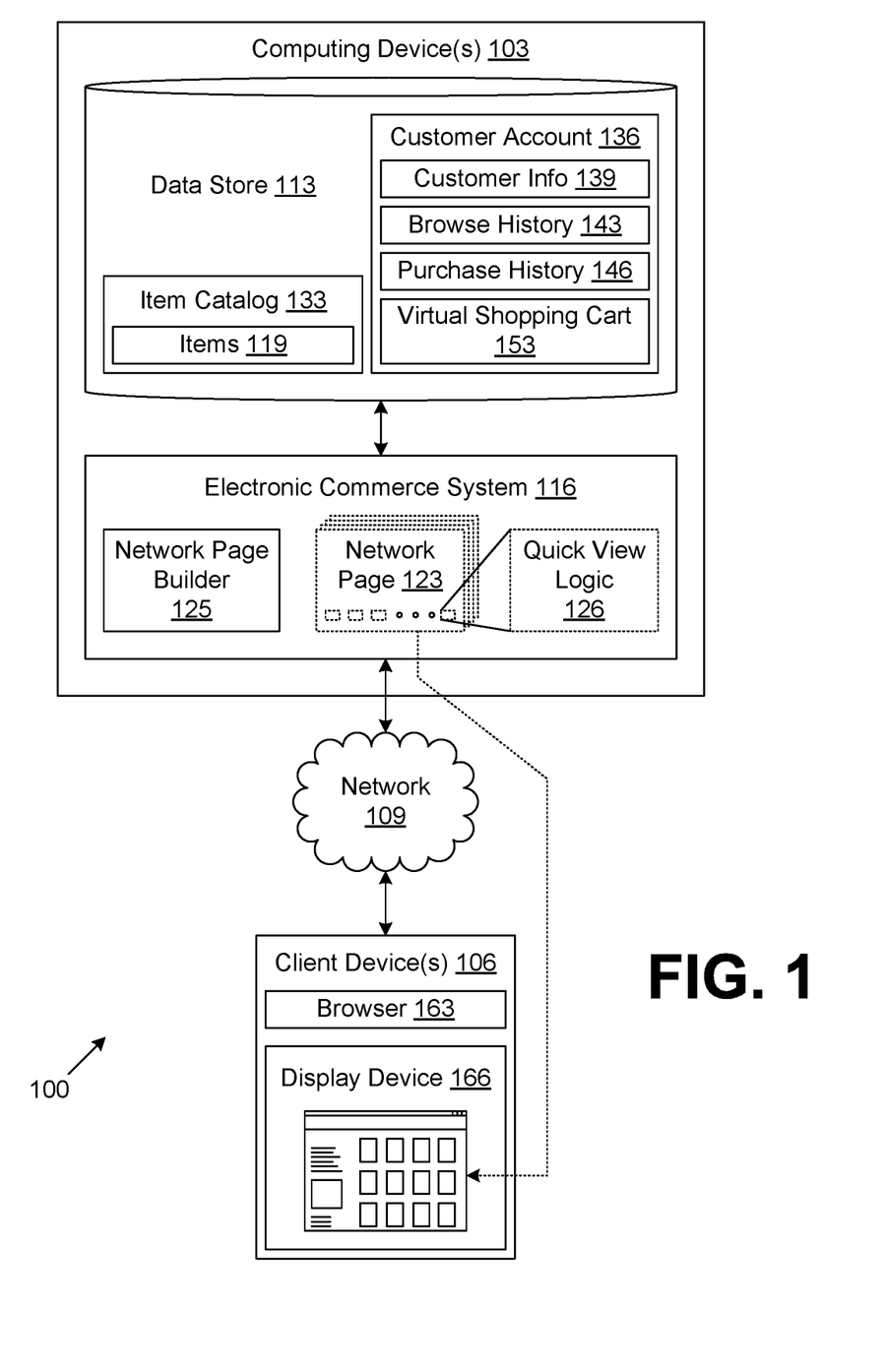
FIG. 1 is a drawing of a networked environment according to various embodiments of the present disclosure.

With reference to FIG. 1, shown is a networked environment 100 according to various embodiments. The networked environment 100 includes a computing device 103 and a client device 106 that are each coupled to a network 109.

The network 109 includes, for example, the Internet, intranets, extranets, wide area networks (WANs), local area networks (LANs), wired networks, wireless networks, or other suitable networks, etc., or any combination of two or more such networks.

The computing device 103 may comprise, for example, a server computer or any other system providing computing capability. Alternatively, a plurality of computing devices 103 may be employed that are arranged, for example, in one or more server banks or computer banks or other arrangements. For example, a plurality of computing devices 103 together may comprise a cloud computing resource, a grid computing resource, and/or any other distributed computing arrangement. Such computing devices 103 may be located in a single installation or may be dispersed among many different geographical locations. For purposes of convenience, the computing device 103 is referred to herein in the singular. Even though the computing device is referred to in the singular, it is understood that a plurality of computing devices 103 may be employed in the various arrangements as described above.

Various applications and/or other functionality may be executed in the computing device 103 according to various embodiments. Also, various data is stored in a data store 113 that is accessible to the computing device 103. The data store 113 may be representative of a plurality of data stores as can be appreciated. The data stored in the data store 113, for example, is associated with the operation of the various applications and/or functional entities described below.

The components executed on the computing device 103 include, for example, an electronic commerce system 116 and other applications, services, processes, systems, engines, or functionality not discussed in detail herein. The electronic commerce application 116 is executed in order to facilitate the online purchase of items 119 over the network 109. The electronic commerce application 116 also performs various backend functions associated with the online presence of a merchant in order to facilitate the online purchase of items 119 as will be described. For example, the electronic commerce application 116 generates network pages 123 such as web pages or other types of network content that are provided to clients 106 in response to requests for the purpose of selecting items 119 for purchase, rental, download, lease, or other form of consumption as will be described. To this end, the electronic commerce application 116 includes a network page builder 125 to generate such network pages 123.

At least some of the network pages 123 generated by the network page builder 125 in the electronic commerce system 116 include quick view logic 126. The quick view logic 126 comprises an executable module or portion embedded or included in a network page 123 that facilitates browsing through a list of items 119 depicted in a search result network page 123 or other type of network page 123 that lists a plurality of items 119 for possible purchase as will be described.

The data stored in the data store 113 includes, for example, an item catalog 133 that includes items 119, customer accounts 136, and potentially other data. The customer accounts 136 include data relating to the relationships of customers with the online merchant who sells items 119 through the electronic commerce system 116. The information includes customer information 139 such as name, billing addresses, shipping addresses, payment instrument information, and other information. Each customer account 136 also includes a browse history 143, a purchase history 146, a virtual shopping cart 153, and other information relating to the interaction between a customer and the electronic commerce system 116. The network page builder 125 is configured to generate at least one checkout pipeline network page 123 to facilitate a purchase of at least one of the items 119 added to the virtual shopping cart.

The client device 106 is representative of a plurality of client devices that may be coupled to the network 109. The client device 106 may comprise, for example, a processor-based system such as a computer system. Such a computer system may be embodied in the form of a desktop computer, a laptop computer, a personal digital assistant, a cellular telephone, set-top box, music players, web pads, tablet computer systems, game consoles, or other devices with like capability.

The client device 106 may be configured to execute various applications such as a browser 163 and/or other applications. The browser 163 may be executed in the client device 106, for example, to access and render network pages, such as web pages, or other network content served up by the computing device 103 and/or other servers. The client device 106 may be configured to execute applications beyond browser 163 such as, for example, email applications, instant message applications, word processors, spreadsheets, and/or other applications. The client device 106 includes a display device 166 upon which various rendered network pages 123a may be displayed. In addition, the client device 106 may include other peripheral components as can be appreciated.

Next, a general description of the operation of the various components of the networked environment 100 is provided. To begin, it is assumed that a user of the client device 106 executes the browser 163 or other appropriate application in order to interact with the electronic commerce system 116. In one situation, a user may perform a search for items 119 in the item catalog 133 by entering an appropriate search string into a search string text box in a network page 123 served up by the electronic commerce system 116. The search string may be submitted to the electronic commerce system 116 that performs a search in the item catalog 133 for items 119 that are responsive to the search string.

As a result, one or more items 119 may be identified in the item catalog 133 that are then included in a search result network page 123 that is sent to the client device 106 and rendered by the browser 163 on the display device 166 to present a listing of the items 119 to the user. When generating the search result network page 123, the electronic commerce system 116 embeds quick view logic 126 therein as an executable portion of the network page 123. Each of the items 119 listed in the search result network page 123 may be represented by an image and/or information about such item 119. The information may include, for example, an item name, a purchase price, item features, and other information as can be appreciated. In one embodiment, the search result network page 123 presents a limited amount of information with respect to each item 119 since it is possible that there may be a large number of items 119 to present, thereby leaving little room for significant amounts of information with respect to each item 119.

The quick view logic 126 that is embedded or included in the search result network page 123 facilitates a roving designation of one of the images of the items 119 to provide for quick viewing of details of respective items 119 by a customer. As will be described, the roving designation is specified by navigating from image to image associated with respective items 119. In addition, the quick view logic 126 further generates a window that appears to be associated with or anchored to the current designated one of the images of a respective item 119. According to one embodiment, the window at least partially borders the current designated one of the images of a respective item 119. Alternatively, the image may be entirely included within the window as will be described. This window presents information detail about the currently designated item 119 depicted in the image that is greater than the information provided about such an item 119 without the window. In addition, the window may present one or more components that facilitate the purchase of an item 119 depicted in the image, or that may facilitate a user taking other action with respect to the item 119 as will be described.

By virtue of the operation of the quick view logic 126, the network page 123 may operate in one of two modes to facilitate browsing through items 119 depicted thereon as will be described. According to various embodiments, the quick view logic 126 provides for an improved browsing experience facilitating rapid consideration of items 119 listed in a search result network page 123 or other type of network page as will be described.

In the following discussion, depictions of examples of rendered network pages 123 are described. Such network pages 123 are depicted as including various graphical components that may be manipulated for various purposes. It is understood that the actual graphical components depicted are merely examples of the many different types of graphical components that may be employed to accomplish the same functionality and that the actual types of graphical components depicted in a given network page 123 to accomplish various purposes is design specific.

Figure 2:
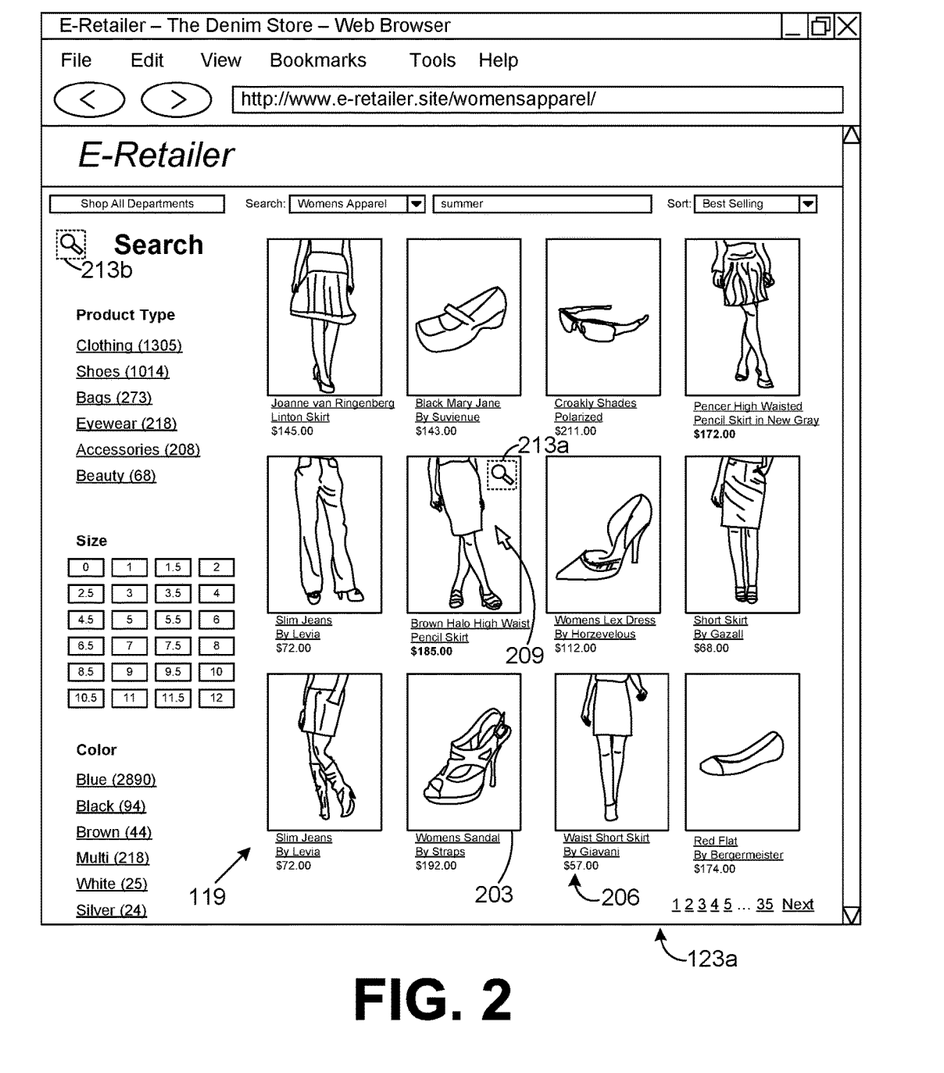
FIG. 2 is a drawing of an example of a user interface rendered by a client in the networked environment of FIG. 1 according to various embodiments of the present disclosure.

Referring next to FIG. 2, shown is one example of a search result network page 123 (FIG. 1), denoted herein as network page 123a, according to various embodiments. The network page 123a includes a listing of a plurality of items 119 that were responsive to a search request. Alternatively, the listing of items 119 depicted in the network page 123a may be generated in some other manner. To this end, the network page 123a comprises a search result network page to provide a specific example of a network page 123 that includes a listing of items 119. Each of the items 119 is represented by an image and predefined information detail 206. According to one embodiment, a first level of information detail 206 is depicted in the network page 123a as will be described.

The user may manipulate a mouse or other device associated with the client device 106 to move a cursor 209 around the network page 123a. When the cursor 209 is hovered over a given image 203 of an item 119, an icon 213a appears in a position that indicates a relationship between the icon 213a and the image 119. According to one embodiment, the icon 213a may be depicted as being superimposed on top of one of the images 119 over which the cursor 209 is hovered. Alternatively, an icon 213b may be depicted on some other location on the network page 123a that performs the same function of the icon 213a.

According to various embodiments, the network page 123a shows a first mode of operation in which the quick view logic 126 is not employed to navigate among the items 119 depicted in the network page 123a. In particular, a first level of information detail 206 is associated with each of the images 203 of the items 119. The information detail 206 may further comprise a link that may be clicked upon or otherwise manipulated using the cursor 209 or other component in order to view an item detail network page 123 (FIG. 1) that provides a greater level of information detail 206 with respect to a given one of the items 119.

However, when the cursor 209 is positioned or hovered over an image 203 or item detail 206 associated with a given one of the items 119, then according to one embodiment, an icon 213a appears in association with such item 119. In one embodiment, the icon 213a may be rendered over a portion of a respective one of the images 203 over which the cursor 209 hovers. Alternatively, the icon 213b may be depicted at some other location on the network page 123a as shown. Assuming that the user clicks on or otherwise selects a given icon 213a or 213b, then the quick view logic 126 is executed to present a second mode of operation for the network page 123a according to various embodiments as will be described.

Figure 3:
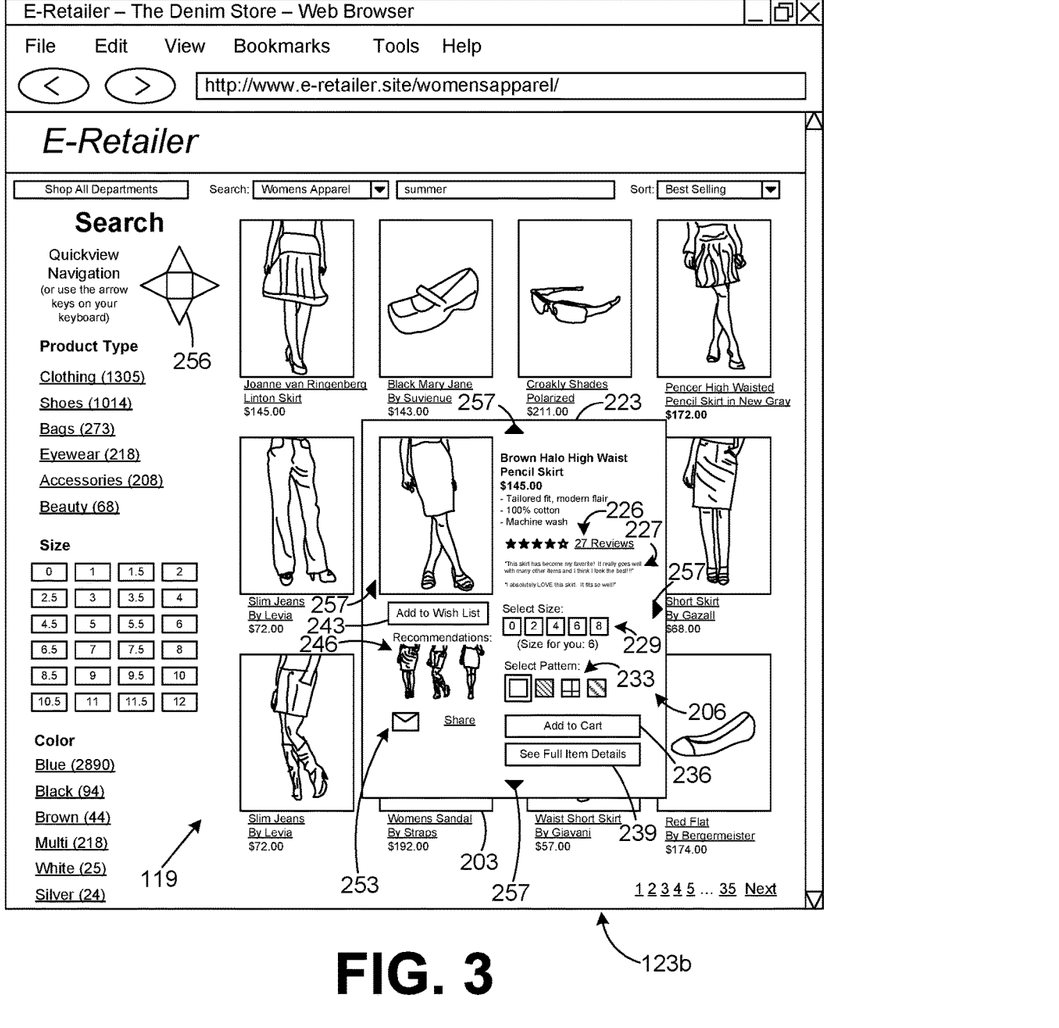
FIG. 3 is drawing of another example of a user interface rendered by a client in the networked environment of FIG. 1 according to various embodiments of the present disclosure.

With reference next to FIG. 3, shown is another example of a network page 123 (FIG. 1), denoted herein as network page 123b, according to various embodiments. The network page 123b is essentially the same as the network page 123a (FIG. 2) except that a second mode of operation is depicted by virtue of the execution of the quick view logic 126 as will be described. The network page 123b includes the images 203 of the items 119 as was depicted with respect to the network page 123a described above.

The network page 123b also includes a window 223 that depicts a second level of information detail 206 about a respective item 119. Various components are included in the window 223 such as, for example, a product rating 226 that may include customer reviews 227, a size selection component 229, a color/pattern selection component 233, and potentially other information about a respective item 119. The window 223 further includes an "add to cart" button 236 and a "see full item details" button 239. The window 223 also includes an "add to wish list" button 243 and item recommendations 246 as shown. In addition, other information and components may be presented in the window 223 such as, for example, sharing components 253 that facilitate sharing information about an item 119 through email or other approaches as can be appreciated.

The size selection component 229 is included in the window 223 to select a size of an item 119 for purchase where relevant. Also, the pattern/color selection component 233 is included in the window 223 to facilitate the selection of a pattern or color for an item 119 to be purchased where relevant.

The "add to cart" button 236 facilitates adding a respective item 119 depicted in the window 223 to a virtual shopping cart that may facilitate the purchase of such item 119 as can be appreciated. The "see full item details" button 239 facilitates the generation of a subsequent network page 123 such as, for example, a detail network page 123 that presents even greater information detail 206 about a respective item 119. Thus, the "see full item details" button 239 may act as, or comprise, a link to the respective detail network page 123 that presents the information detail 206 about the respective item 119.

The detail network page 123 may thus present a third level of information detail 206 about a respective item 206, where the first level of information detail 206 is presented in the network page 123a, and the second level of information detail 206 is presented in the window 223. To this end, the second level of information detail 206 comprises a greater amount of information than the first level of information detail 206. Also, the third level of information detail 206 comprises a greater amount of information than the second level of information detail 206.

The "add to wish list" button 243 may be manipulated in order to add an item 119 depicted in the window 223 to a wish list, registry, or other type of list associated with the user that is maintained in the electronic commerce system 116 (FIG. 1). The item recommendations 246 depict images 203 of items 119 that are recommended for the customer. The recommendations 246 may be generated based at least upon the item 119 viewed in the window 223, browse histories 143, purchase histories 146, or other behavior of one or more customers with respect to the electronic commerce system 116 (FIG. 1) as can be appreciated. The share components 253 may facilitate sharing information detail 206 about an item 119 with others through electronic mail, SMS, social networking sites, or other approaches as can be appreciated. The network page 123b also includes arrow buttons 256 to provide for a directional input to the quick view logic 126 as will be described. Also, according to one embodiment, window arrow buttons 257 are included in the window 223 to provide the directional input to the quick view logic 126.

Upon manipulation of an icon 213a/213b (FIG. 2), the quick view logic 126 generates the window 223 that is anchored to, or otherwise associated with, a given image 203 of an item 119 depicted in the network page 123a (FIG. 2) as is depicted in the network page 123b. In one embodiment as shown, the window 223 is anchored to an image 203 by being generated around a respective one of the images 203. Stated another way, the window 223 is generated in such a position that the image 203 appears within the window 223. In such a case, the window 223 effectively surrounds the image 203.

In another embodiment, the window 223 is anchored to an image 203 by virtue of the fact that the window 223 at least partially borders a designated one of the images 203. For example, the window 223 may be generated such that only two sides of the image 203 border the window 223, where window 223 is positioned such that the respective image 203 lies in the corner of the window 223. It may be the case that the portion of the image 203 that the window 223 borders may be more or less than 2 sides.

By clicking on a respective icon 213a (FIG. 2), a user initially designates image 203 of a respective item 119 for the creation of the window 223 as shown. Alternatively, if the user clicks on the icon 213b (FIG. 2), then a respective one of the images 203 of a respective item 119 may initially be designated for the creation of the window 223. Such an image 203 may be specified, for example, as the image 203 in a predefined corner of the network page 123a, at random, or in some other manner.

According to one embodiment, the window 223 is anchored to a respective image 203 by bordering, surrounding, or otherwise relating to the image 203, where the image 203 remains in its original position within the network page 123. This relays a degree of item permanence with respect to the image 203 of the item 119 to the user. In this manner, a user maintains the belief that the network page 123a with its listing of each of the images 203 of the items 119 endures, even though the window 223 may be generated over respective images 203 of items 119, thereby obscuring or completely blocking the view of such items 119 as can be appreciated. Thus, the user is left with the impression that the window 223 is superimposed over the images 203 and information detail 206 about the items 119 as they are initially depicted in the network page 123a.

Thus, the window 223 is depicted around or relative to a current designated one of the images 203. In this sense, the initial image 203 that is designated for the creation of the window 223 in the first instance may be the image 203 over which the icon 213a is presented when manipulated by the cursor 209, or by a first designated one of the images 203 upon manipulation of the icon 213*b* as described above.

According to one embodiment, the quick view logic 126 (FIG. 1) provides a roving designation of one of the images 203 by navigating from image 203 to image 203. This may be accomplished, for example, by designating respective ones of the images 203 that are adjacent to a current designated one of the images 203 based upon a directional input. The directional input may comprise, for example, a manipulation of one of the arrow buttons 256, a manipulation of one of the window arrow buttons 257, a manipulation of an arrow key or other equivalent key on a keyboard associated with the client device 106, or some other directional input as can be appreciated.

Thus, the window 223 may be employed to quickly show a greater amount of information detail 206 (second level of detail) about respective items 119 by allowing a user to employ directional keys, the arrow buttons 256, or the window arrow buttons 257 to cause the window 223 to move from one image 203 to the next image 203. In this sense, the window 223 would appear to jump from one image 203 to the next adjacent image 203 depending on the directional input received. Thus, the network page 123*b* shows a second mode of operation in which the windrow 223 is depicted in the network page 123*b*. Also, in such mode of operation, the user may navigate from image 203 to image 203 using directional inputs to cause the window 223 to jump from one image 203 to the next image 203. This second mode of operation advantageously allows a user to quickly browse through various items 119 depicted in the network page 123*b* to obtain a greater amount of information about such items 119 to facilitate a more optimal browsing experience. This browsing experience allows customers to more quickly find items 119 they wish to purchase from a merchant as can be appreciated.

In addition, the various components such as the pattern/color selection component 233 may allow a user to change a view of an item 119 in a respective image 203 to the color or pattern selected. Also, the image 203 may be changed in other ways as can be appreciated. For example, various techniques may be employed to cause different views of an item 119 to be depicted in the image 203 depending on appropriate input, for example, as may be described with reference to co-pending patent application entitled "Providing Multiple Views for an Item" filed on Aug. 6, 2010 and assigned U.S. patent application Ser. No. 12/851,638, which is incorporated herein by reference in its entirety.

Figure 4:
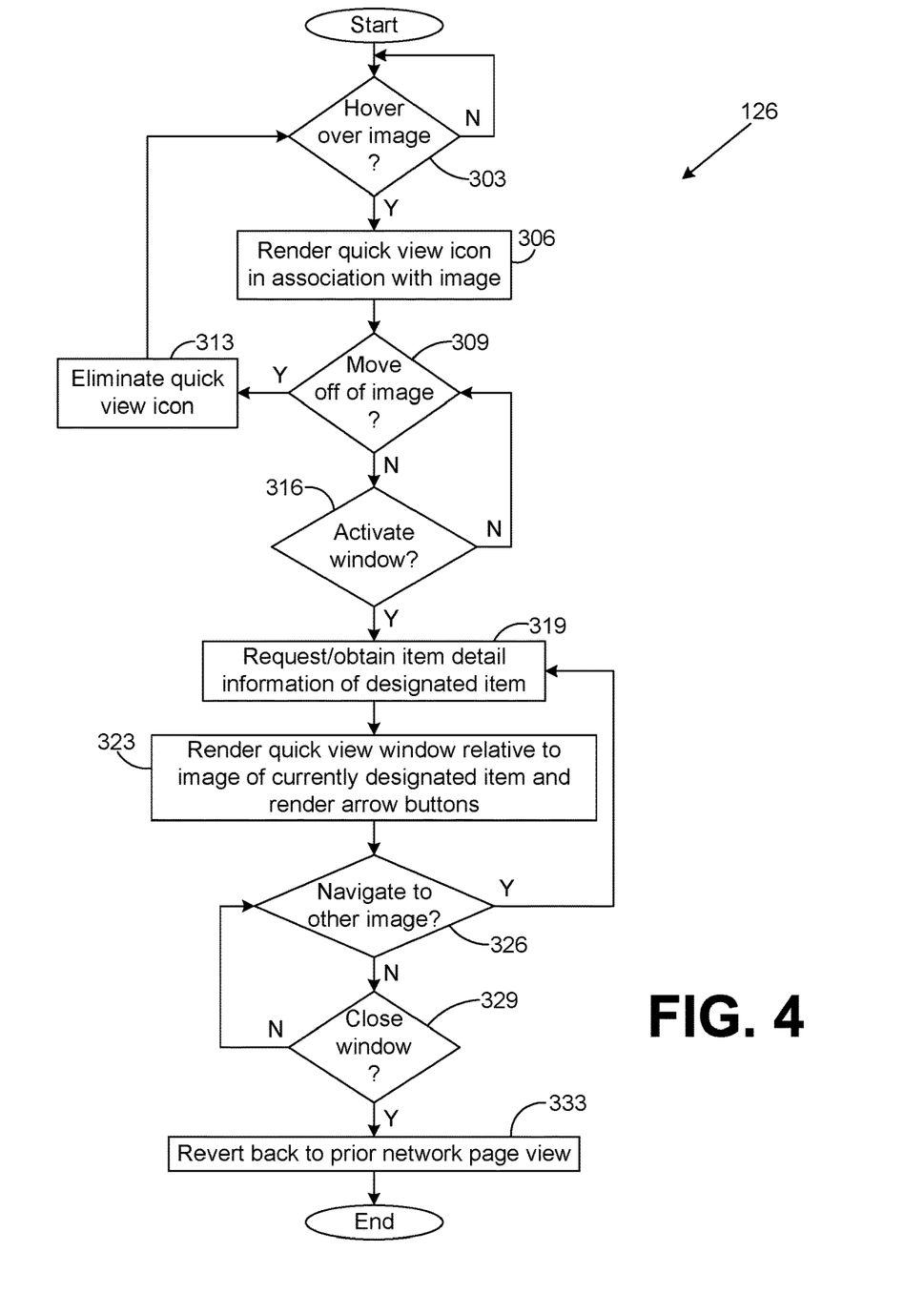
FIG. 4 is a flowchart illustrating one example of functionality implemented as a portion of a network page executed in a computing device in the networked environment of FIG. 1 according to various embodiments of the present disclosure.

Referring next to FIG. 4, shown is a flowchart that provides one example of the operation of the quick view logic 126 according to various embodiments. It is understood that the flowchart of FIG. 4 provides merely an example of the many different types of functional arrangements that may be employed to implement the operation of the quick view logic 126 as described herein. As an alternative, the flowchart of FIG. 4 may be viewed as depicting an example of steps of a method implemented in the client device 106 (FIG. 1) according to one or more embodiments.

Beginning with box 303, the quick view logic 126 determines whether a cursor 209 (FIG. 2) has hovered over a given image 203 of an item 119 depicted in the network page 123*a* (FIG. 2) for a sufficient period of time so that the icon 213*a* (FIG. 2) should be rendered over the image 203 (FIG. 2) or other location. If so, then the quick view logic 126 proceeds to box 306 and renders the icon 213*a* in association with the respective item 119. Alternatively, where the icon 213*b* is already rendered on the display device 166, then quick view logic 126 may skip boxes 303, 306, 309, and 313.

Assuming that the quick view logic 126 has proceeded to box 309, then it determines whether the user has moved the cursor 209 away from the item 119 in question. If so, then the quick view logic 126 proceeds to box 313, in which the icon 213*a* is eliminated from the view. Thereafter, the quick view logic 126 reverts back to box 303.

Assuming that the user continues to hover the cursor 209 over a respective image 203 of a given item 119 in box 309, then the quick view logic 126 proceeds to box 316 in which it is determined whether to activate the window 223 and set the operating mode into the quick view mode. This is determined, for example, based upon whether the user has clicked on the icon 213*a* or provided some other sort of appropriate input indicating a desire to enter the quick view mode of operation.

The quick view logic 126 then proceeds to box 319 to request item detail information associated with the current designated item 119 from the electronic commerce system 116 over the network 109 (FIG. 1). Alternatively, the item detail information to be presented in the window 223 may be included in the network page 123 when it was initially sent to the client device 106. In such case, the request need not be sent to the electronic commerce system 116, where such information is obtained locally having been included in the network page 123 as can be appreciated.

Next, in box 323, the quick view window 223 is rendered relative to the image 203 of a currently designated one of the items 119, as shown with respect to FIG. 3. Also, the arrow buttons 256 may be rendered as well. Note, however, that it is possible that the user may simply use the arrow keys or other appropriate keys on a keyboard associated with the client 106 rather than using the arrow buttons 256 as described above. The window arrow buttons 257 may be employed as well.

In box 326, the quick view logic 126 determines whether a user has provided an input indicating that the quick view logic 126 is to navigate to another one of the images 203 displayed in the network page 123*b*. Such input is a directional input such as, for example, clicking one of the arrow buttons 256, the window arrow buttons 257, or pressing an arrow key as can be appreciated.

Assuming that a user has indicated that the window 223 is to be moved to an adjacent image 203 to a current designated image 203, then the quick view logic 126 reverts back to 319 in order to obtain item detail of item 119 depicted in the adjacent image 203 to ultimately render the quick view window 223 around or relative to the newly designated adjacent image 203.

Assuming that the customer has not designated an adjacent one of the images 203 relative to a current designated image 203 as described above, then the quick view logic 126 proceeds to box 329 in which it is determined whether the window 223 is to be closed and the initial mode of operation is to be reinstated. A user may do so by clicking anywhere on the network page 123*b* outside of the window 223. Alternatively, a button or other graphical component may be presented that facilitates reverting back to the prior view of the network page 123*a* without the window 223 and the arrow buttons 256. In this respect, the network page 123 reverts back to the initial mode of operation. If the window is not to be closed as determined in box 329, then the quick view logic 126 reverts back to box 326 as shown.

If the window 223 is to be closed in box 329, then the quick view logic 126 proceeds to box 333 to revert back to the prior network page 123a view without the window 223 or other components associated with such mode of operation.

Figure 5:
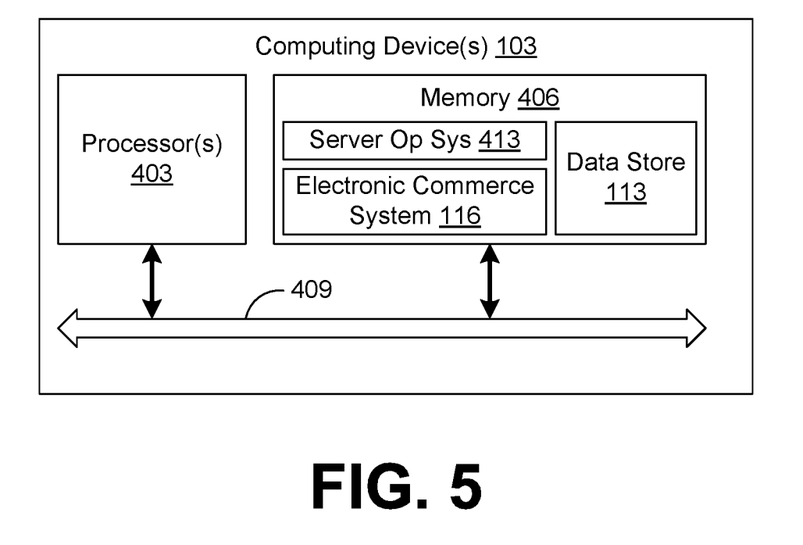
FIG. 5 is a schematic block diagram that provides one example illustration of a computing device employed in the networked environment of FIG. 1 according to various embodiments of the present disclosure.
Figure 6:
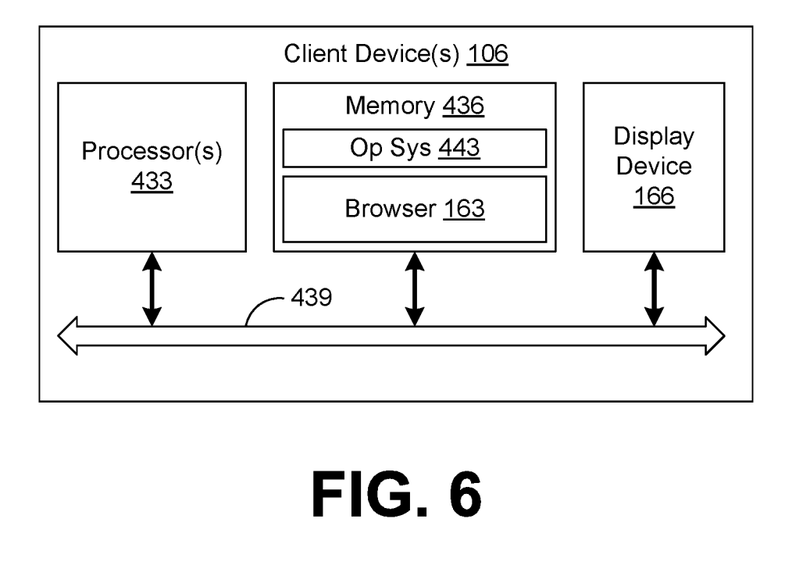
FIG. 6 is a schematic block diagram that provides one example illustration of a client device employed in the networked environment of FIG. 1 according to various embodiments of the present disclosure.

With reference to FIGS. 5 and 6, shown are schematic block diagrams that illustrate examples of the computing device 103 and the client device 106 according to an embodiment of the present disclosure.

The computing device 103 includes at least one processor circuit, for example, having a processor 403 and a memory 406, both of which are coupled to a local interface 409. To this end, the computing device 103 may comprise, for example, at least one server computer or like device. The local interface 409 may comprise, for example, a data bus with an accompanying address/control bus or other bus structure as can be appreciated.

The client device 106 includes at least one processor circuit, for example, having a processor 433 and a memory 436, both of which are coupled to a local interface 439. To this end, the client device 106 may comprise, for example, at least one server computer or like device. The local interface 439 may comprise, for example, a data bus with an accompanying address/control bus or other bus structure as can be appreciated.

Stored in the memory 406 are both data and several components that are executable by the processor 403. In particular, stored in the memory 406 and executable by the processor 403 are the server operating system 413 and the electronic commerce application 115 including the page builder 125 (FIG. 1). Also, the quick view logic 126 is stored in the memory 406 to be added to respective network pages 123, and potentially other applications. To this end, the quick view logic 126 may be executed by the processor circuit in the client 106 by the browser 163, such processor circuit including the processor 433 and the memory 436.

Also stored in the memory 406 may be a data store 113 and other data. In addition, an operating system may be stored in the memory 406 and executable by the processor 403.

Stored in the memory 436 are both data and several components that are executable by the processor 433. In particular, stored in the memory 436 and executable by the processor 433 is the browser 163. The browser 163 is employed to execute the quick view logic 126 on the client device 106 as described above.

It is understood that there may be other applications that are stored in the memories 406/436 and are executable by the processors 403/433 as can be appreciated. Where any component discussed herein is implemented in the form of software, any one of a number of programming languages may be employed such as, for example, C, C++, C#, Objective C, Java, Javascript, Perl, PHP, Visual Basic, Python, Ruby, Delphi, Flash, or other programming languages.

A number of software components are stored in each of the memories 406/436 and are executable by the respective processors 403/433. In this respect, the term "executable" means a program file that is in a form that can ultimately be run by a respective one of the processors 403/433. Examples of executable programs may be, for example, a compiled program that can be translated into machine code in a format that can be loaded into a random access portion of a memory 406/436 and run by a processor 403/433, source code that may be expressed in proper format such as object code that is capable of being loaded into a random access portion of a memory 406/436 and executed by a processor 403/433, or source code that may be interpreted by another executable program to generate instructions in a random access portion of a memory 406/436 to be executed by a respective processor 403/433, etc. An executable program may be stored in any portion or component of a memory 406/436 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Each of the memories 406/436 is defined herein as including both volatile and nonvolatile memory and data storage components. Volatile components are those that do not retain data values upon loss of power. Nonvolatile components are those that retain data upon a loss of power. Thus, each memory 406/436 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, each processor 403/433 may represent multiple processors and each memory 406/436 may represent multiple memories that operate in parallel processing circuits, respectively. In such a case, each local interface 409/439 may be an appropriate network that facilitates communication between any two of the multiple processors 403/433, between any processor 403/433 and any of the memories 406/436, or between any two of the memories 406/436, etc. The local interface 409/439 may comprise additional systems designed to coordinate this communication, including, for example, performing load balancing. The processor 403/433 may be of electrical or of some other available construction.

Although the electronic commerce application 116, including the network page builder 125, and the quick view logic 126, and any other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowchart of FIG. 4 shows the functionality and operation of an implementation of portions of the quick view logic 126. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 403/433 in a computer system or other system. The machine code may be converted from the source code, etc. If embodied in hardware, each block may represent a circuit or a number of interconnected circuits to implement the specified logical function(s).

Although the flowchart of FIG. 4 shows a specific order of execution, it is understood that the order of execution may differ from that which is depicted. For example, the order of execution of two or more blocks may be scrambled relative to the order shown. Also, two or more blocks shown in succession in FIG. 4 may be executed concurrently or with partial concurrence. Further, in some embodiments, one or more of the blocks shown in FIG. 4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, such as the electronic commerce application 116 (including the network page builder 125) and the quick view logic 126, that comprises software or code can be embodied in any non-transitory computer-readable medium for use by or in connection with an instruction execution system such as, for example, a processor 403/433 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system, comprising:
   means for generating instructions that cause a display of a plurality of images of a plurality of items in a network page rendered on a display device of a client device, wherein a first level of information detail about each of the items is presented in the network page, wherein a window included in the network page is anchored to a currently designated one of the images, the window presenting a second level of information detail about a respective one of the items depicted in the currently designated one of the images presented in the window;
   means for generating instructions that cause the window to navigate from a first position anchored to the currently designated one of the images to a second position anchored to another one of the images adjacent to the currently selected one of a plurality of buttons included in the window, thereby redesignating the other one of the images as the currently designated one of the images; and
   include at least one item recommendation in the window, the item recommendation being generated based at least in part upon the item depicted in the currently designated one of the images.

2. The system of claim 1, wherein the window is anchored to the currently designated one of the images in that the currently designated one of the images is surrounded by the window.

3. The system of claim 1, wherein the window is anchored to the currently designated one of the images in that the window at least partially borders the currently designated one of the images.

4. The system of claim 1, wherein the navigation from image to image is accomplished by designating one of the images adjacent to the currently designated one of the images based upon a directional input.

5. A method, comprising:
   generating, by at least one computing device, instructions that cause a display of a plurality of images of a plurality of items in a network page rendered on a display device of a client device, wherein a first level of information detail about each of the items is presented in the network page, wherein a window included in the network page is anchored to a currently designated one of the images, the window presenting a second level of information detail about a respective one of the items depicted in the currently designated one of the images presented in the window;
   generating, by the at least one computing device, instructions that cause the window to navigate from a first position anchored to the currently designated one of the images to a second position anchored to another one of the images adjacent to the currently designated one of the images according to a directional input corresponding to a selected one of a plurality of buttons included in the window, thereby redesignating the other one of the images as the currently designated one of the images; and
   including at least one item recommendation in the window, the item recommendation being generated based at least in part upon the item depicted in the currently designated one of the images.

6. The method of claim 5, wherein the window is anchored to the currently designated one of the images in that the currently designated one of the images is surrounded by the window.

7. The method of claim 5, wherein the window is anchored to the currently designated one of the images in that the window at least partially borders the currently designated one of the images.

8. The method of claim 5, wherein the navigation from image to image is accomplished by designating one of the images adjacent to the currently designated one of the images based upon a directional input.

9. The method of claim 8, wherein the directional input further comprises a manipulation of an arrow key on a keyboard associated with the client device.

10. The method of claim 8, wherein the directional input further comprises a manipulation of a directional component rendered in the network page.

11. The method of claim 8, wherein the directional input further comprises a manipulation of a directional component rendered in the window.

12. The method of claim 5, wherein the second level of information detail includes a greater amount of information than the first level of information detail.

13. The method of claim 5, further comprising including a component in the window to add the item depicted in the currently designated one of the images to a virtual shopping cart.

14. The method of claim 5, further comprising including a rating of the item depicted in the currently designated one of the images in the window.

15. The method of claim 5, further comprising including a link in the window to a detail network page that presents a third level of information about the item depicted in the currently designated one of the images.

16. A system, comprising:
at least one computing device having a processor circuit comprising a processor and a memory storing instructions that, when executed by the processor, cause the processor to at least:
cause a display of a plurality of images of a plurality of items in a network page rendered on a display device of a client device, wherein a first level of information detail about each of the items is presented in the network page, wherein a window included in the network page is anchored to a currently designated one of the images, the window presenting a second level of information detail about a respective one of the items depicted in the currently designated one of the images presented in the window;
cause the window to navigate from a first position anchored to the currently designated one of the images to a second position anchored to another one of the directional input corresponding to a selected one of a plurality of buttons included in the window, thereby redesignating the other one of the images as the currently designated one of the images; and
include at least one item recommendation in the window, the item recommendation being generated based at least in part upon the item depicted in the currently designated one of the images.

17. The system of claim 16, wherein the second level of information detail includes a greater amount of information than the first level of information detail.

18. The system of claim 16, wherein the instructions further cause the at least one computing device to at least include a component in the window to add the item depicted in the currently designated one of the images to a virtual shopping cart.

19. The system of claim 16, wherein the instructions further cause the at least one computing device to at least include a rating of the item depicted in the currently designated one of the images in the window.

* * * * *